(12) United States Patent
Tagashira

(10) Patent No.: US 8,886,949 B2
(45) Date of Patent: Nov. 11, 2014

(54) INFORMATION PROCESSING APPARATUS AND METHOD THEREFOR

(71) Applicant: Canon Kabushiki Kaisha, Tokyo (JP)

(72) Inventor: Nobuhiro Tagashira, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/662,624

(22) Filed: Oct. 29, 2012

(65) Prior Publication Data

US 2013/0138966 A1 May 30, 2013

(30) Foreign Application Priority Data

Nov. 30, 2011 (JP) ................................. 2011-262658
Oct. 17, 2012 (JP) ................................. 2012-230264

(51) Int. Cl.
*H04L 9/32* (2006.01)

(52) U.S. Cl.
CPC ......... *H04L 9/3242* (2013.01); *H04L 2209/125* (2013.01)
USPC ......................................... 713/179; 713/181

(58) Field of Classification Search
CPC ................ H04L 9/3242; H04L 9/3244; H04L 2209/125
USPC .......................................... 713/179, 181, 193
See application file for complete search history.

(56) References Cited

U.S. PATENT DOCUMENTS

| 5,555,404 | A | * | 9/1996 | Torbjørnsen et al. | .................. 1/1 |
| 8,301,884 | B2 | * | 10/2012 | Choi | .............................. 713/168 |
| 8,352,737 | B2 | * | 1/2013 | Solis et al. | ..................... 713/168 |
| 2005/0252977 | A1 | * | 11/2005 | Grezes et al. | ................. 235/492 |
| 2008/0016576 | A1 | * | 1/2008 | Ueda et al. | ....................... 726/26 |

FOREIGN PATENT DOCUMENTS

JP 4576936 B 11/2010

* cited by examiner

*Primary Examiner* — Samson Lemma
(74) *Attorney, Agent, or Firm* — Carter, DeLuca, Farrell & Schmidt, LLP

(57) ABSTRACT

Electronic data is input. The electronic data is divided into N (N is an integer satisfying N≥2) segments. Examination data is generated by repeating, up to the Nth segment, the computation processing of using the computation result obtained by performing predetermined computation on the data of the Mth (M is an integer satisfying 1≤M≤N−1) segment as an input for predetermined computation of the data of the (M+1)th segment. Verification data for the electronic data is generated so as to contain, as intermediate data, the examination data and a computation result in the middle of generating the examination data.

16 Claims, 12 Drawing Sheets

INFORMATION PROCESSING APPARATUS AND METHOD THEREFOR

BACKGROUND OF THE INVENTION

1. Field of the Invention

The present invention relates to the information processing of verifying the integrity of electronic data.

2. Description of the Related Art

Digital signature and message authentication code (MAC) are known as techniques of preventing alteration of data and verifying the integrity of data.

Digital signature is a technique of generating signature data for verifying integrity based on a public key cryptosystem. This technique is also called "electronic signature". Signature data is generated by generating the hash value (also called the message digest) of data as a signature target using a hash function and encrypting the hash value with its private key. When performing signature verification, this system decrypts the signature data with the public key and compares the decryption result with the hash value generated from the signature target data. If they match each other, the technique determines that the signature is authenticated. Typical digital signature algorithms are RSA (Rivest Shamir Adleman) and DSA (digital signature algorithm).

A hash function is a one-way function of generating data (hash value) of a predetermined size from data of an arbitrary size. In particular, features of a hash value are that it is difficult to obtain other data from which the hash value is obtained and it is difficult to obtain two different data from which the same hash values are obtained. Typical hash functions are MD5 (message digest algorithm 5), SHA1 (secure hash algorithm 1), SHA2 (secure hash algorithm 2), and the like.

A message authentication code is signature data (also sometimes called a MAC value) for verifying integrity using a common key. There are HMAC (hash-based MAC) using a hash function, CMAC (cipher-based MAC) using a block cipher, and the like.

Japanese Patent No. 4576936 (literature 1) discloses a technique of verifying the integrity of data by adapting the above digital signature technique. This technique solves the problem of taking much time to perform verification with a current increase in data amount when verifying the integrity of contents (data) recorded on a recording medium. The technique disclosed in literature 1 fragments a content and generates and verifies signature data of each fragmented data. In signature verification, when the verification of fragmented data has succeeded, the technique determines that the verification of the integrity of the content has succeeded. That is, performing parallel processing of fragmented data will speed up verification.

As an information processing environment, a parallel processing environment has become general owing to the trend to a multicore CPU and the use of GPU (graphics processing unit) as image processing accelerators for general-purpose calculation.

Digital signature includes a hash function. A hash function is the recursive sequential processing of repetitively inputting the processing result obtained on the preceding stage to the subsequent stage, and hence is difficult to speed up by parallel processing. Note that the scheme disclosed in literature 1 fragments data and separately verifies each fragmented data, and hence can speed up the processing by independently and parallelly processing fragmented data. In other words, this technique verifies each fragmented data, and signature data is a set of signature data for each fragmented data. That is, this technique uses signature data different from that used by a general scheme of collectively processing overall data.

SUMMARY OF THE INVENTION

In one aspect, an information processing apparatus comprising: an input section configured to input electronic data; a divider configured to divide the electronic data into N (N is an integer satisfying $N \geq 2$) segments; a computation section configured to generate examination data by repeating, up to an Nth segment, computation processing of using a computation result obtained by performing predetermined computation on data of an Mth (M is an integer satisfying $1 \leq M \leq N-1$) segment as an input for the predetermined computation of data of an (M+1)th segment; and a generator configured to generate verification data for the electronic data which includes the examination data and intermediate data of a computation result in the middle of generating the examination data.

According to the aspect, it is possible to speed up verification processing when verifying the integrity of electronic data and also maintain compatibility with a case in which the entire verification target electronic data are collectively processed.

Further features of the present invention will become apparent from the following description of exemplary embodiments with reference to the attached drawings.

DESCRIPTION OF THE EMBODIMENTS

Figure 1:
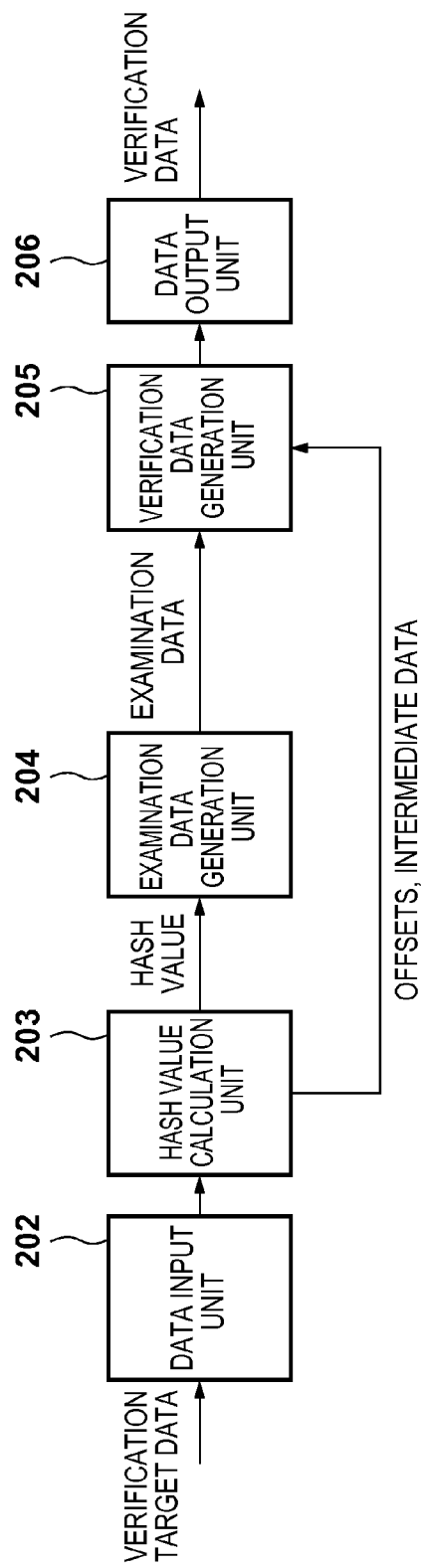
FIG. 1 is a block diagram for explaining a functional arrangement for generating verification data in an information processing apparatus according to an embodiment.

Information processing in an embodiment according to the present invention will be described in detail below with reference to the accompanying drawings.

First Embodiment

Arrangement of Apparatus

An information processing apparatus according to an embodiment is implemented by supplying programs for implementing the functions and processing to be described later to a computer apparatus such as a personal computer including a microprocessor (CPU) and memories such as a read-only memory (ROM) and a random access memory (RAM). Note that it is possible to use a hard disk drive (HDD) or a solid state drive (SSD) to temporarily store data which cannot be completely stored in a RAM functioning as a work memory and store various kinds of programs and data.

In this embodiment, the CPU may be constituted by a plurality of chips or a single CPU chip may include a plurality of CPU cores based on the premise that the CPU is configured to perform parallel computation. Parallel computation may be performed using a GPU or the like. In this case, the GPU is regarded as part of the CPU.

In addition, the information processing apparatus includes various types of interfaces. For example, they include a network interface connecting to a network, a serial bus interface such as USB (Universal Serial Bus) connecting to input devices such as a keyboard and a mouse, a user interface, and a video interface connecting to a monitor which displays computation results.

Note that the information processing apparatus according to this embodiment is not limited to a computer apparatus and includes various types of information devices such as information appliances and multi functional peripherals (MFPs). Alternatively, such apparatuses may be dedicated chips, peripherals, and the like which implement the functions and processing to be described later.

[Functional Arrangement]

Generation of Verification Data

A functional arrangement for generating verification data in the information processing apparatus according to the embodiment will be described below with reference to the block diagram of FIG. 1.

A data input unit 202 inputs electronic data (to be referred to as verification target data hereinafter) which is a verification target for integrity. Note that verification target data includes data held in the information processing apparatus, data read from a nonvolatile memory device such as a USB memory, and data input from an external device via a network or the like.

A hash value calculation unit 203 calculates a value (hash value) representing verification target data input by the data input unit 202 using a one-way function. More specifically, the hash value calculation unit 203 divides verification target data into N (N is an integer satisfying $N \geq 2$) segments, and repeats, up to the Nth end segment, the computation of using a computation result on the Mth (M is an integer satisfying $1 \leq M \leq N-1$) segment as an input for computation on the (M+1)th segment. In the case of SHA1, the segment size is 512 bits, and the hash value is 160 bits. The hash value calculation unit 203 outputs a hash value as a calculation result, and also outputs a pair of a hash-intermediate value in the middle of calculation and information for specifying the position of a portion (that is, a segment) of verification target data processed to generate the hash-intermediate value on the verification target data (to be described in detail later). A hash-intermediate value in the middle of calculation will be referred to as "intermediate data" hereinafter, and information for specifying the position of a segment will be referred to as an "offset" hereinafter. In addition, a hash function to be used may be a general hash algorithm such as MD5, SHA1, or SHA2, and is not limited to any specific hash algorithm.

An examination data generation unit 204 generates examination data from the hash value output from the hash value calculation unit 203 using a key. When examination data is digital signature data (to be simply referred to as signature data), generation processing for signature data is broken into hash processing and signature generation processing in the narrow sense. The processing performed by the examination data generation unit 204 corresponds to the latter (the signature generation processing in the narrow sense). That is, the processing by the hash value calculation unit 203 and processing by the examination data generation unit 204 will implement processing equivalent to the generation of general signature data.

For example, in the case of DSA signature, the processing performed by the examination data generation unit 204 corresponds to modular exponentiation operation using a key. In the case of RSA signature, the processing performed by the examination data generation unit 204 corresponds to encoding and modular exponentiation operation. Note that the generation of signature data requires a key, especially a private key, and it is possible to read a private key from a nonvolatile memory device such as a USB memory held in the information processing apparatus or input a private key from an external device via a network or the like.

Figure 2:
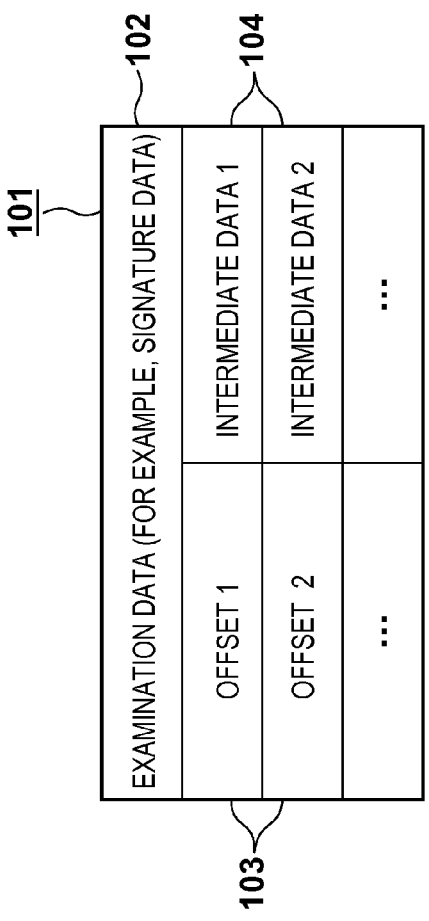
FIG. 2 is a view showing the arrangement of verification data.

A verification data generation unit 205 inputs a pair of intermediate data and an offset from the hash value calculation unit 203 and examination data from the examination data generation unit 204, and generates verification data from the input data. FIG. 2 shows the arrangement of verification data. Verification data 101 is formed from a plurality of pairs of offsets 103 and intermediate data 104 generated from segments corresponding to the offsets, in addition to examination data 102.

A data output unit 206 outputs the verification data generated by the verification data generation unit 205. The output destination of the verification data is, for example, a nonvolatile memory device such as a USB memory or an external device via a network.

Verification of Verification Target Data

A functional arrangement for verifying verification target data in the information processing apparatus according to the embodiment will be described with reference to the block diagram of FIG. 3.

A data input unit 208 inputs verification target data and verification data for the verification target data. Note that, as shown in FIG. 2, verification data is constituted by a plurality of pairs of offsets and intermediate data generated from segments corresponding to the offsets, in addition to examination data. In addition, verification target data and verification data include data held in the information processing apparatus, data read from a nonvolatile memory device such as a USB memory, or data input from an external device via a network or the like.

A dividing unit 209 outputs the segments obtained by dividing the verification target data input by the data input unit 208 to a hash value calculation unit 210 based on the hash function used to generate the verification data input by the data input unit 208 and the offsets contained in the verification data. The dividing unit 209 also outputs the intermediate data contained in the verification data to a comparison unit 213, and outputs the examination data contained in the verification data to an examination data verification unit 212.

The hash value calculation unit 210 calculates the hash values of input segments. That is, the hash value calculation unit 210 generates intermediate data and the hash value of verification target data by repeating, up to the end segment, the computation of using a computation result on the first segment divided from verification target data as an input for computation on the second segment following the first segment. In this case, if an input segment is a segment containing only the first data of the verification target data (to be referred to as a head segment hereinafter), the hash value calculation unit 210 computes a hash value using a defined hash initial value. If an input segment is a segment containing data following the first data (in other words, not containing the first data) (to be referred to as an intermediate segment hereinafter), the hash value calculation unit 210 computes a hash-intermediate value using a computation result on a segment immediately preceding the segment. If an input segment is an end segment containing only the last data of the verification target data, the data to be calculated is the hash value of the verification target data. In addition, the hash value calculation unit 210 outputs a computation result on a segment corresponding to an offset as intermediate data.

Figure 3:
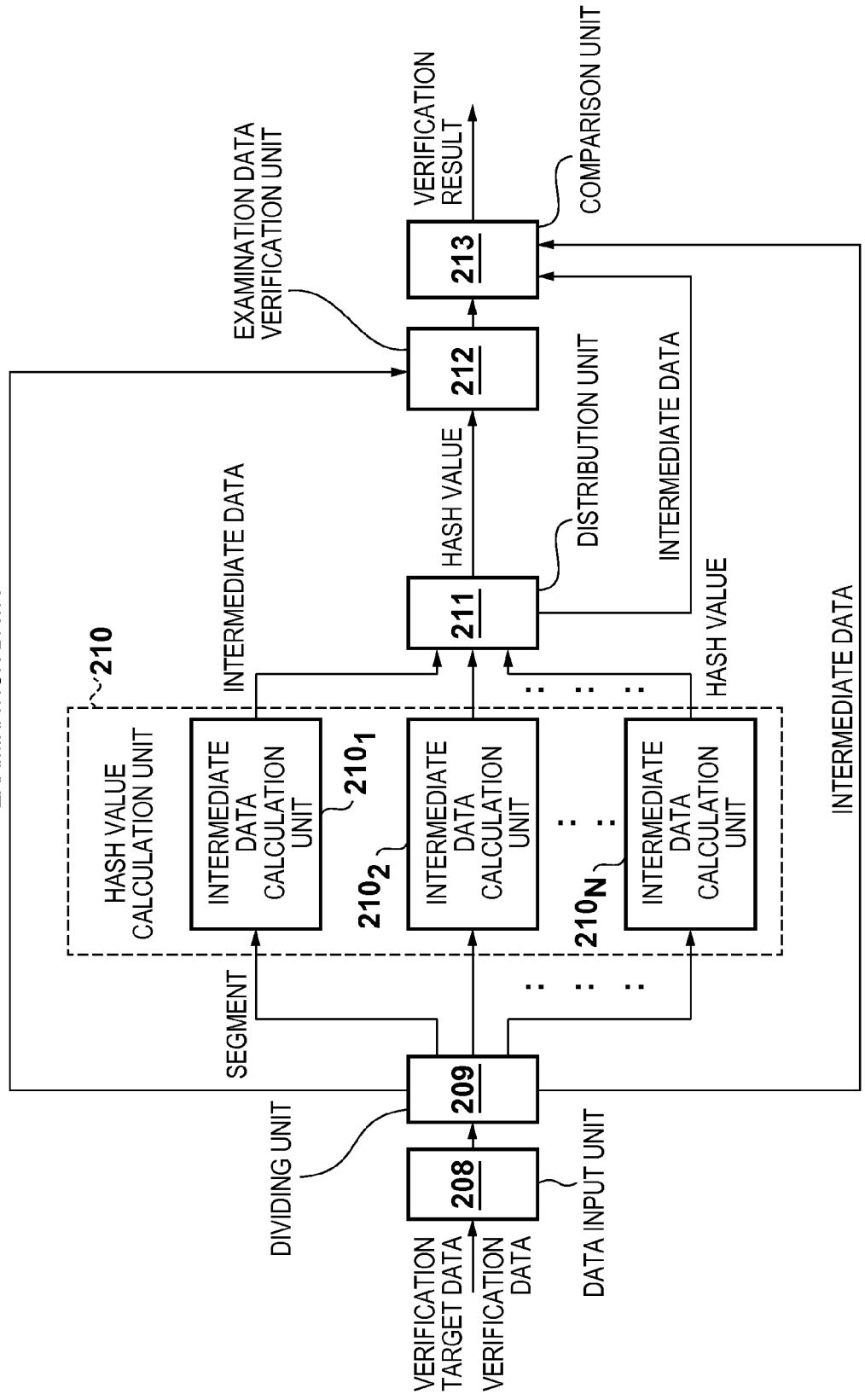
FIG. 3 is a block diagram for explaining a functional arrangement for verifying verification target data in the information processing apparatus according to the embodiment.

As shown in FIG. 3, the hash value calculation unit 210 formed as a parallel processing unit. That is, the hash value calculation unit 210 generates intermediate data by inputting a segment corresponding to an offset or a plurality of segments from the dividing unit 209 to any one of intermediate calculation units $210_1$ to $210_N$ constituting the parallel processing unit. In this manner, it is possible to parallelly process generation of intermediate data.

A distribution unit 211 controls the output destination of the intermediate data or hash value output from the hash value calculation unit 210. The distribution unit 211 outputs the hash value generated from the end segment to the examination data verification unit 212, and outputs other intermediate data to the comparison unit 213. Note that the distribution unit 211 distributes two or more output values output from the hash value calculation unit 210 as a single output value without combining or computing the outputs. This makes it possible to distribute each output from the hash value calculation unit 210 without waiting for the completion of processing by the hash value calculation unit 210.

The examination data verification unit 212 performs verification processing of the examination data input from the dividing unit 209 using a key and the hash value of the verification target data input from the distribution unit 211. That is, when examination data is signature data, processing equivalent to general verification processing for signature data is performed using the hash value of verification target data which is obtained by the hash value calculation unit 210 and the processing performed by the examination data verification unit 212.

In the case of DSA signature, the processing performed by the examination data verification unit 212 corresponds to modular exponentiation operation using a key. In the case of RSA signature, the processing performed by the examination data verification unit 212 corresponds to modular exponentiation operation and decoding. Note that even when the hash value calculation unit 210 is configured as a parallel processing unit, the examination data verification unit 212 can perform verification processing at the time point when a hash value is input from the distribution unit 211 without the need to wait for the completion of processing by the hash value calculation unit 210.

The comparison unit 213 outputs a verification result on the integrity of verification target data from the intermediate data contained in the verification data input from the dividing unit 209, the intermediate data input from the hash value calculation unit 210, and a verification result on the examination data input from the examination data verification unit 212. That is, if all the comparison results on the intermediate data contained in the verification data and the intermediate data calculated by the hash value calculation unit 210 indicate matches, and the verification result on the verification data indicates a success, the comparison unit 213 determines that the verification of the integrity of the verification target data has succeeded. Otherwise, the comparison unit 213 determines that the verification of the integrity of the verification target data has failed. Note that the processing performed by the comparison unit 213 uses all intermediate data and examination data, and hence needs to wait for the completion of processing by the hash value calculation unit 210.

[Intermediate Data]

Hash Value Calculation Unit (Verification Data Generation Side)

A method of generating intermediate data in the hash value calculation unit 203 on the verification data generation side will be described, together with an outline of a hash value, with reference to FIG. 4.

Figure 4:
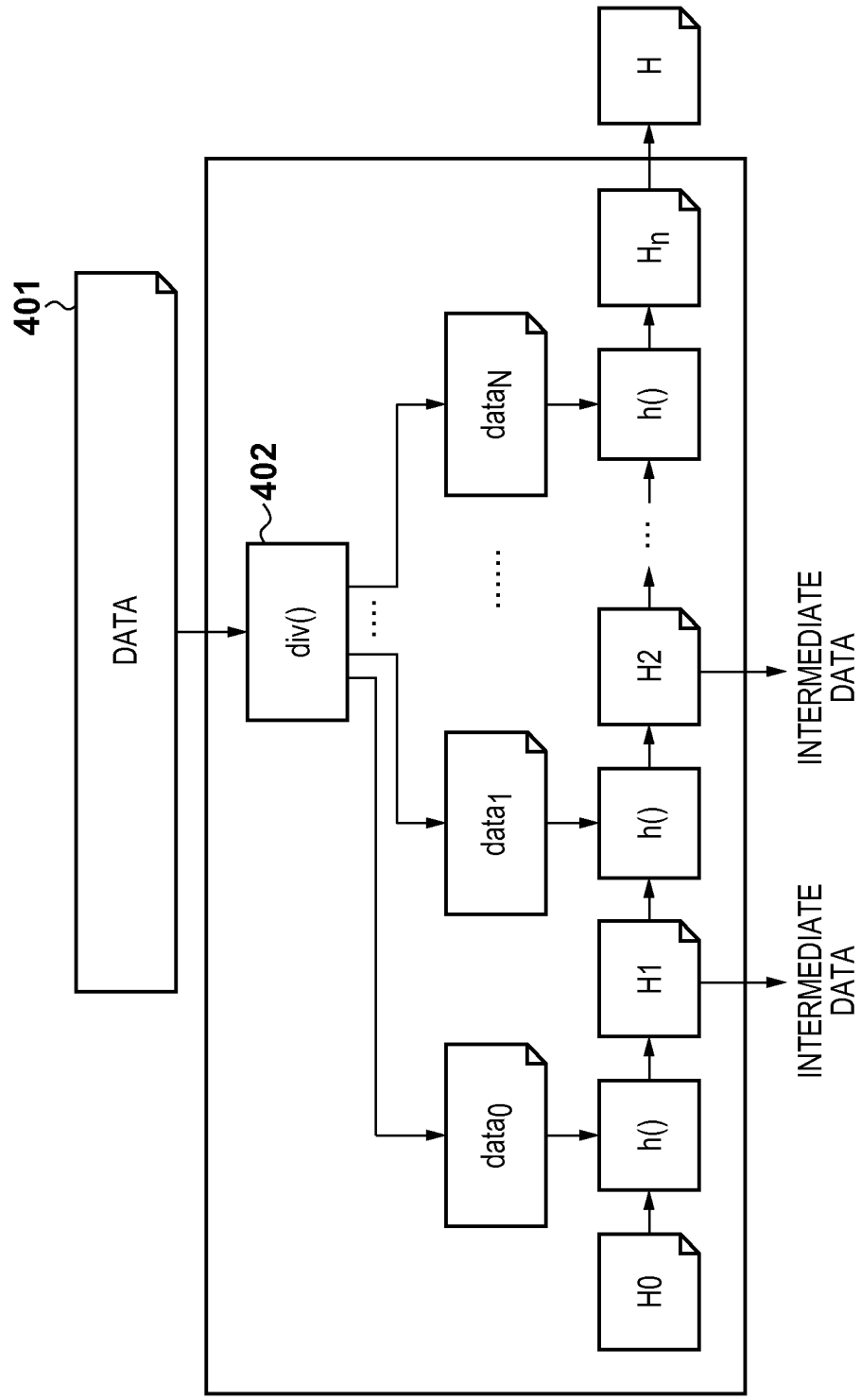
FIG. 4 is a view for explaining a method of generating intermediate data in a hash value calculation unit, together with an outline of a hash function.

Referring to FIG. 4, data 401 is verification target data. Dividing processing (div( )) 402 divides the data 401 into segments of a predetermined size. When using SHA1, which is a typical hash function, the segment size is 512 bits. Although not shown, padding processing is performed for an end segment to make it have a segment size.

First of all, the hash value calculation unit 203 obtains a value H1 by inputting data $data_0$ of a head segment and a predetermined hash initial value H0 to a hash processing unit h( ). The hash value calculation unit 203 then obtains a value H2 by inputting data $data_1$ of the next segment (intermediate segment) and the value H1 to the hash processing unit h( ). A hash value Hn finally obtained by repeating this processing up to data $data_N$ of the end segment is a hash value H of the data 401.

Intermediate data is a hash-intermediate value $H_M$ of data $data_M$ of a given segment which is input to the hash processing unit h( ) which computes data $data_{M+1}$ of a segment following the given segment. That is, the hash-intermediate value H1 of the data $data_0$ of the head segment, the hash-intermediate value H2 of the data $data_1$ of an intermediate segment, and the like are output as intermediate data. In this case, a segment is the unit of data input to predetermined computation processing (the hash processing unit h( ) in the case shown in FIG. 4). FIG. 4 shows an example of outputting intermediate data for each predetermined computation processing. Although intermediate data is output for each segment in this processing, there is no need to output intermediate data for each segment, as described later.

In addition, an offset corresponding to intermediate data is the data size of verification target data processed up to the generation of the intermediate data. In the case of SHA1, the segment size is 512 bits, an offset corresponding to the intermediate data H1 represents 512 bits, and an offset corresponding to the second intermediate data H2 represents 1,024 bits. That is, an offset is an integer multiple of a segment size dependent on a hash function.

Intermediate Data Calculation Unit

Figure 5:
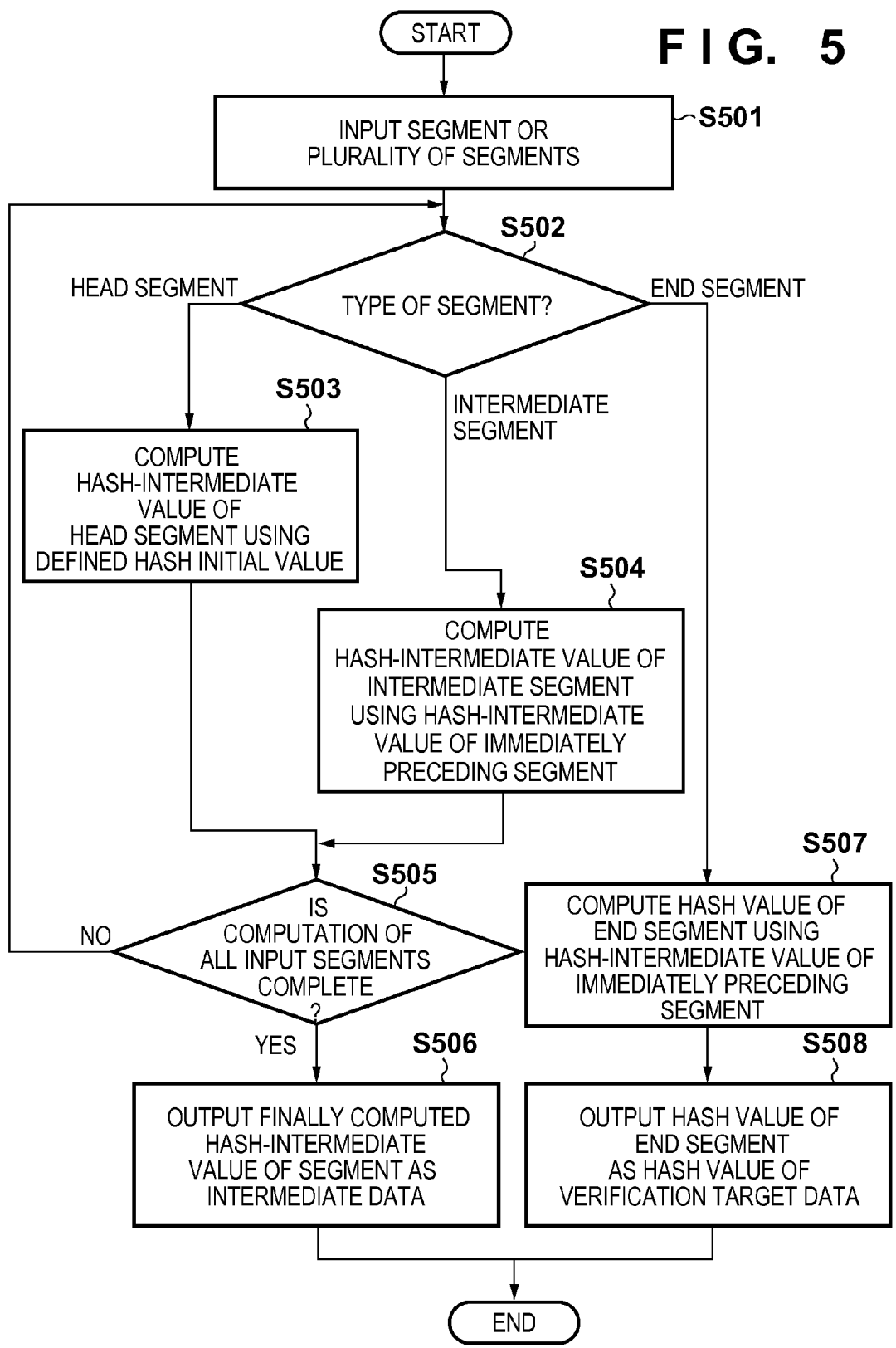
FIG. 5 is a flowchart for explaining the processing performed by an intermediate data calculation unit.

The processing performed by each of the intermediate data calculation units $210_1$ to $210_N$ will be described with reference to the flowchart of FIG. 5.

The intermediate data calculation unit inputs a segment or a plurality of segments from the dividing unit 209 (step S501), and determines the type of input segment (step S502). Note that the intermediate data calculation unit determines the type of segment using an offset.

Upon determining that the input segment is the head segment, the intermediate data calculation unit computes the hash-intermediate value of the head segment using a predetermined hash initial value (step S503). Upon determining that the input segment is an intermediate segment, the intermediate data calculation unit computes the hash-intermediate value of the segment using the hash-intermediate value of a segment immediately preceding the segment (step S504). The processing in steps S503 and S504 is the same as that using a general hash function from which padding processing is excluded. The intermediate data calculation unit determines whether computation on all the input segments is complete (step S505). If the intermediate data calculation unit determines that the computation is not complete, the process returns to step S502. If the computation on all the input segments is complete, the intermediate data calculation unit outputs the hash-intermediate value of the segment computed at last as intermediate data (step S506). The intermediate data calculation unit then terminates the processing.

Upon determining that the input segment is the end segment, the intermediate data calculation unit computes the hash value of the end segment using the hash-intermediate value of a segment immediately preceding the end segment (step S507). Note that the intermediate data calculation unit executes padding processing, as needed. The intermediate data calculation unit then outputs the hash value of the end segment as the hash value of verification target data (step S508), and terminates the processing.

[Dividing Method for Verification Target Data]

The dividing unit 209 divides verification target data based on the hash function used for the generation of verification data and the offsets contained in the verification data. The simplest dividing method is to divide verification target data into 10 partial data based on offsets corresponding to the intermediate data, when the verification data contains 10 intermediate data. Note that each data obtained by dividing the verification data in accordance with the offsets will be referred to as "partial data" hereinafter. Partial data contains one or a plurality of segments divided from verification target data in accordance with the hash function used for the generation of the verification data. This simple dividing method is desired when the number of intermediate data is equal to or less than the number of intermediate data calculation units $210_1$ to $210_N$ (a number N of parallel processing units). If the number of intermediate data exceeds N, unprocessed partial data are sequentially input to any one of the intermediate data calculation units $210_1$ to $210_N$ which has completed processing, thereby processing all the partial data.

As another dividing method, there is available a method using only partial intermediate data in consideration of the parallelism of processing by the information processing apparatus which performs verification processing.

Figure 6:
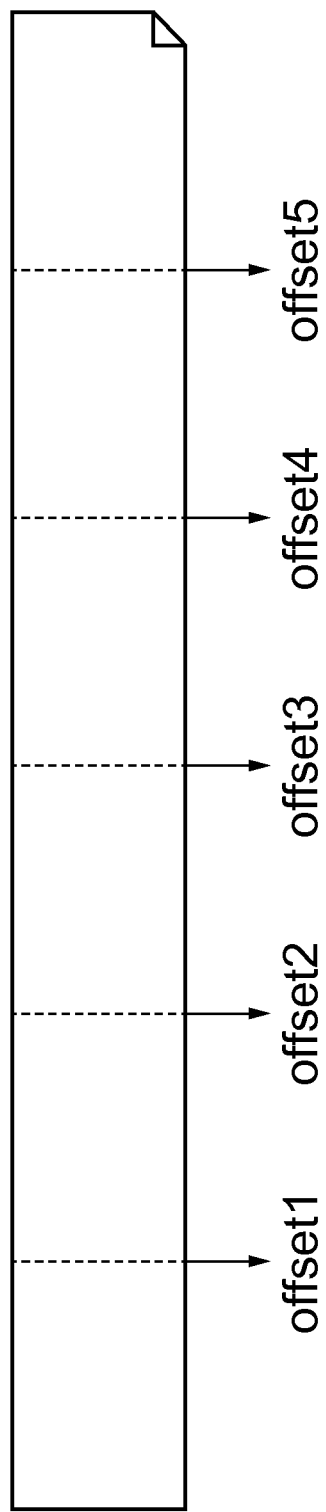
FIG. 6 is a view showing an example of verification data.

FIG. 6 shows an example of verification data. This example includes five intermediate data and one examination data (hash value of verification target data) with offsets 1 to 5. When processing the verification data shown in FIG. 6 using the intermediate data calculation units $210_1$ and $210_2$ as two parallel units, it is possible to perform verification processing using two partial data, that is, intermediate data and examination data corresponding to offset 3 dividing the verification target data into two portions.

Likewise, when processing the verification data shown in FIG. 6 using the intermediate data calculation units $210_1$ to $210_3$ as three parallel units, it is possible to perform verification processing using three partial data, that is, intermediate data and examination data corresponding to offsets 2 and 4 dividing the verification target data into three portions.

Decreasing the division number of verification target data will decrease the number of intermediate data compared by the comparison unit 213 and reduce the processing performed by the comparison unit 213 as compared with when simply dividing the verification target data. In the case shown in FIG. 6, when dividing verification target data using only offset 3, the comparison unit 213 may compare intermediate data corresponding to offset 3 once. Likewise, when dividing verification target data using offsets 2 and 4, the comparison unit 213 may compare intermediate data respectively corresponding to offsets 2 and 4 twice.

Note that the parallelism of processing by the information processing apparatus may be input from the data input unit 208 or may be acquired by a parallelism acquisition unit (not shown) provided separately. Note that the most typical parallelism of processing is the number of CPU cores of a CPU chip.

When verifying the integrity of verification target data using verification data containing offsets and intermediate data based on digital signature, it is possible to perform parallel processing of verification processing and implement high-speed verification processing. As shown in FIG. 2, verification data can contain general signature data as examination data and perform verification using general verification data using only signature data.

That is, when verifying the integrity of electronic data, it is possible to speed up verification processing by parallelization and maintain compatibility with collective processing of entire verification target electronic data.

Modification of First Embodiment

The above has described the case in which verification data includes pairs of offsets and intermediate data. It is, however, possible to calculate offsets from the number of intermediate data. That is, determining to equally divide verification data both on the generation side and the verification side allows to determine offsets from the number of intermediate data. This makes it unnecessary to include any offsets in verification data. As a result, the hash value calculation unit 203 need not output any offsets, and the data input unit 208 need not acquire any offsets. Note, however, that it is necessary to control the dividing of verification target data by the dividing unit 209 based on the hash function used for the generation of verification data and the number of intermediate data.

FIG. 4 exemplifies an example of outputting intermediate data corresponding to all segments. It is however unnecessary to always output intermediate data corresponding to all the segments. As the number of intermediate data increases, the data size of verification data increases. For example, it is possible to determine the number of intermediate data to be output in accordance with the assumed parallelism of processing in verification processing.

If, for example, it is possible to perform two-parallel processing, one intermediate data may be output to divide verification target data into two portions in verification processing. If it is possible to perform three-parallel processing, two intermediate data may be output to divide verification target data into three portions in verification processing. That is, when N-parallel processing is assumed, N−1 intermediate data may be output.

If there are a plurality of parallelisms of assumed processing, the number of intermediate data to be output may be determined from the least common multiple of the parallelisms. Alternatively, if the parallelism of processing is not unique or is unknown, the number of intermediate data to be output may be determined from the assumed maximum parallelism. In this case, the data input unit 202 inputs the assumed parallelism of processing, and the hash value calculation unit 203 controls the number of intermediate data to be output based on the input parallelism of processing.

In addition, if an information processing apparatus which performs verification processing is the same information processing apparatus which generates verification data, a parallelism acquisition unit (not shown) may be provided on the verification data generation side to determine the number of intermediate data output from the hash value calculation unit 203 using the acquired parallelism.

As shown in FIG. 4, determining the parallelism of processing, in other words, determining the number of intermediate data to be output, will make the hash value calculation unit 203 output offsets and intermediate data to the verification data generation unit 205 for each processing by the hash processing unit h( ). Upon temporarily holding all intermediate data and completing the calculation of a hash value, the verification data generation unit 205 determines intermediate data to be actually output from the number of intermediate data held and the number of intermediate data output.

Figure 11:
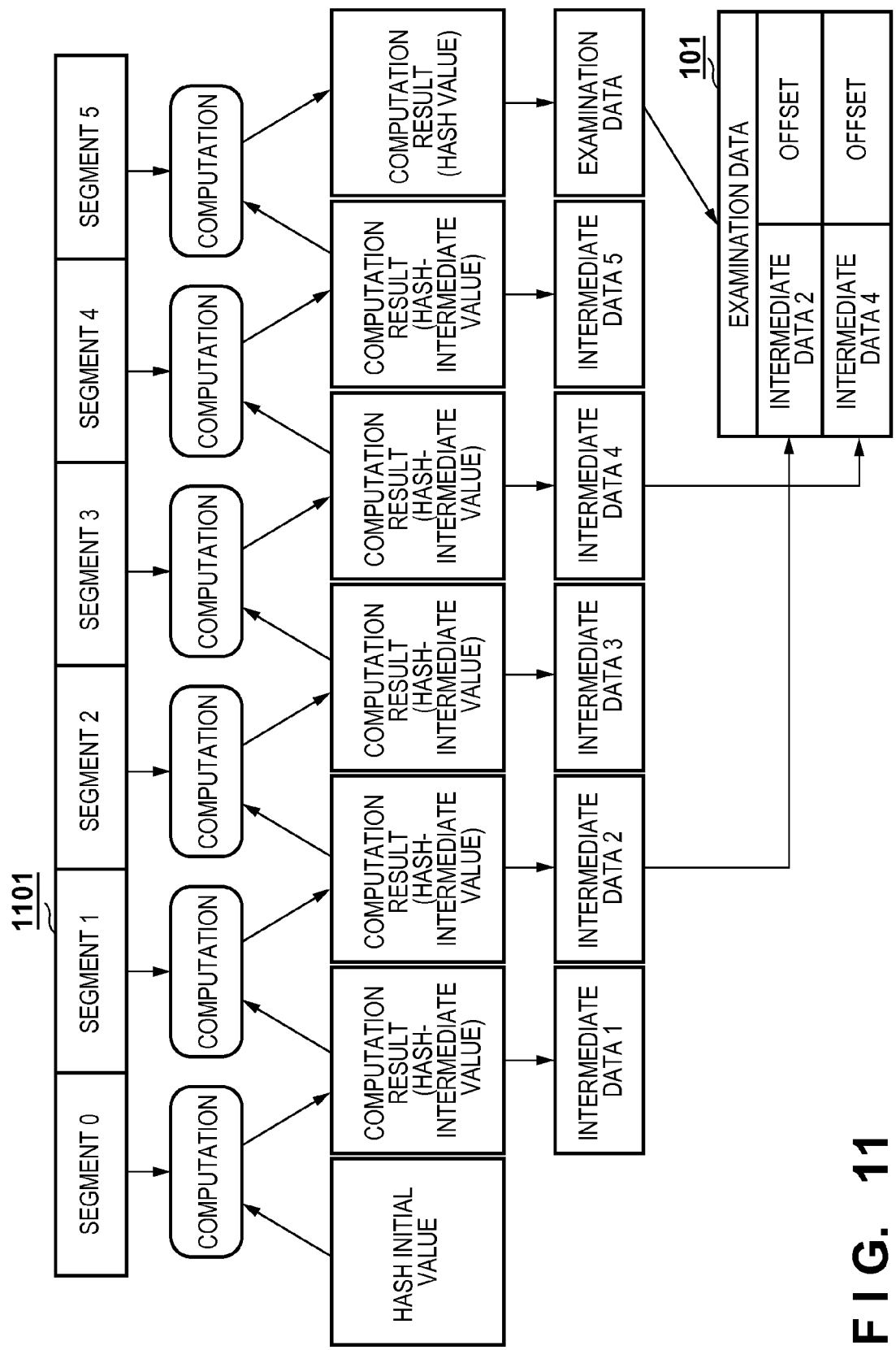
FIG. 11 is a view for explaining a method of generating verification data in a case in which it is possible to perform three-parallel processing in verification processing.

A method of generating verification data in a case in which three-parallel processing can be performed in verification processing will be described with reference to FIG. 11. Verification target data 1101 is divided into a plurality of segments based on the segment size of a hash function to be used. The following will exemplify a case in which a hash function is SHA1, and verification target data is 3,072 bits. Since the segment size in SHA1 is 512 bits, verification target data is divided by 512. As a consequence, the verification target data 1101 is divided into six segments. Note that verification target data includes padding data.

A hash-intermediate value is computed for each segment, and five intermediate data are generated until examination data is obtained. The verification data generation unit 205 temporarily holds these five intermediate data, and generates the verification data 101 including intermediate data 2 and intermediate data 4 in accordance with three-parallel processing.

When, for example, temporarily holding a total of L intermediate data and outputting intermediate data corresponding to N-parallel processing, that is, N−1 intermediate data, the verification data generation unit 205 obtains first an output interval S as S=ceiling (L/N). Note that ceiling(x) is called a ceiling function, which is a function of returning to a real number x the minimum integer equal to or more than x. The verification data generation unit 205 sorts intermediate data in ascending order of offsets, and outputs a total of N−1 intermediate data extracted at output intervals S. When, for example, holding seven intermediate data (L=7) and performing three-parallel processing (N=3), since S=ceiling(7/3)=3, the verification data generation unit 205 generates verification data from the third and sixth intermediate data.

In the case of hash function SHA1, since the segment size is 512 bits, the verification target data 1101 is divided every 512 bits. If, however, the verification target data 1101 is large, the division number becomes large. A general hash computation unit has a function of dividing data into segments in the computation unit. Therefore, the hash computation unit can perform dividing in two steps, that is, dividing the verification target data 1101 by an integer multiple of the segment size and dividing each segment. That is, it is possible to regard two segment data of FIG. 11 as one set, divide the set into three portions, regard a computation unit corresponding to the portions as a hash computation unit, and divide each segment in the hash computation unit.

Figure 12:
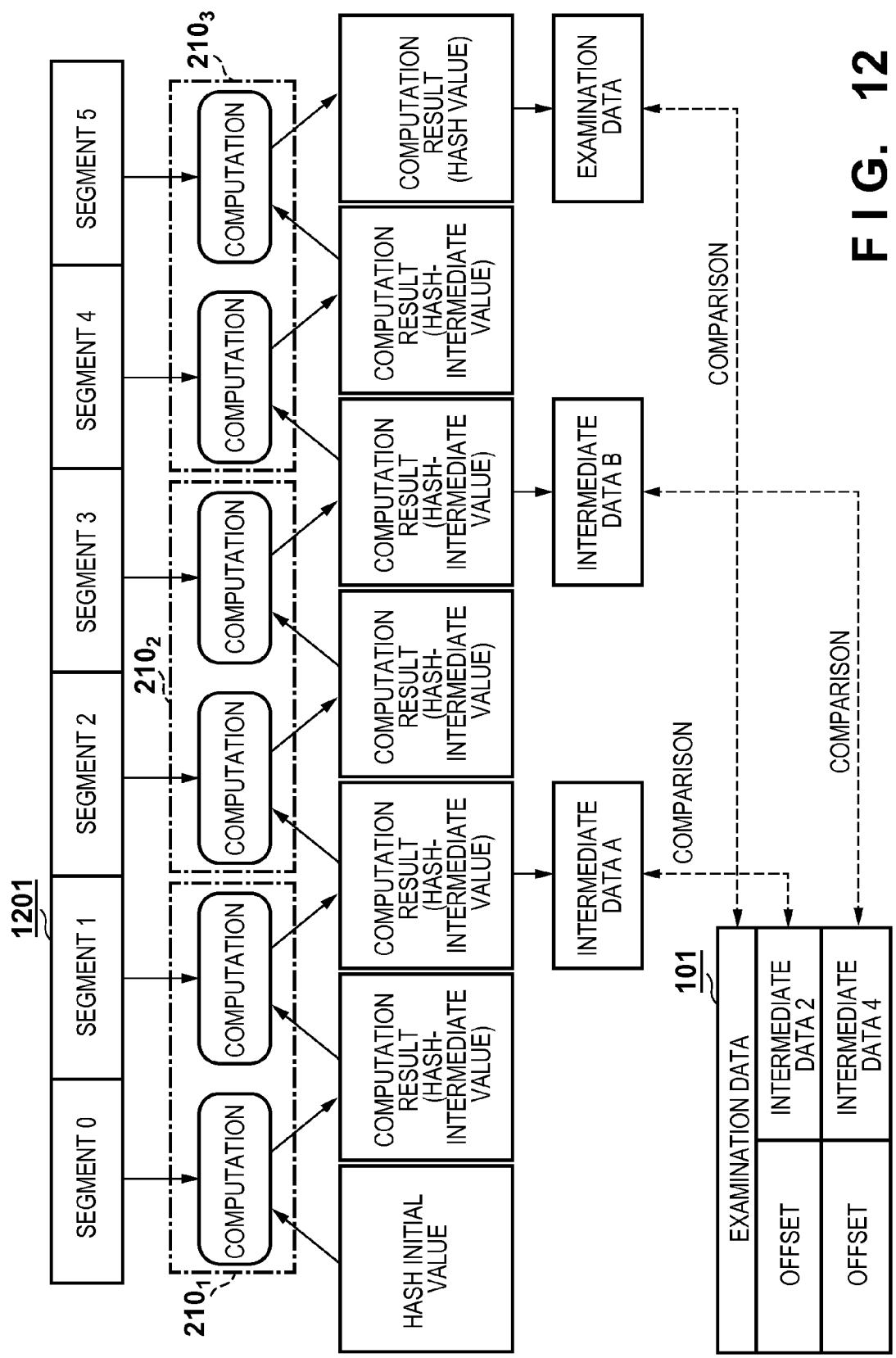
FIG. 12 is a view for explaining an example of performing verification processing of verification target data by three-parallel processing.

An example of performing verification processing for verification target data by three-parallel processing will be described with reference to FIG. 12. Verification target data 1201 is divided into six segments based on the segment size of the hash function used for the generation of the verification data 101. Each segment is further divided into three partial data based on the number of intermediate data included in the verification data 101. Each partial data is input to any one of intermediate data calculation units 2101 to 2103 to generate intermediate data A and B and examination data. The comparison unit 213 compares intermediate data A with intermediate data 2, and compares intermediate data B with intermediate data 4. The examination data verification unit 212 performs verification using examination data.

As the verification target data 1201 increases, the division number greatly increases. Since a general hash unit has a function of dividing data into segments in the computation unit. Like generation processing, verification processing can also use two-step dividing operation of dividing data by an integer multiple of the segment size and dividing each segment using the hash computation unit.

The above has described the method of equally dividing data assuming that a computer environment for verification processing is a homogeneous parallel processing environment. However, it is possible to divide data at a throughput ratio assuming a heterogeneous parallel processing environment. Assuming, for example, a two-parallel computer environment having a throughput of 1:x output interval S=ceiling{L/(1+x)} is obtained. Intermediate data are sequentially sorted in increasing order of offsets, and verification data is generated from (i×S)th (where i is a natural number) intermediate data.

In addition, if the verification data generation side and the verification data verification side share a method of determining intermediate data to be output, it is possible to determine offsets from the size of verification target data and the number of intermediate data. The dividing unit 209 obtains the data size of input verification target data, obtains L by dividing the data size by a segment size dependent on a hash function, obtains N from the number of intermediate data contained in verification data, and obtains output interval S=ceiling(L/N). The dividing unit 209 further obtains an offset by multiplying the output interval S by the segment size dependent on the hash function.

The number of intermediate data can be adaptively determined in this manner.

Second Embodiment

Information processing in the second embodiment according to the present invention will be described below. The same reference numerals as in the first embodiment denote the same constituent elements in the second embodiment, and a detailed description of them will be omitted.

The first embodiment has exemplified the case in which digital signature is used for the base of the verification of the integrity of electronic data. The second embodiment will exemplify a case in which an HMAC as a message authentication code is used for the base of verification of the integrity of electronic data. Note that both digital signature and HMAC use a hash function, and basically perform the same processing as that in the first embodiment, but slightly differ in intermediate data. The difference in intermediate data will be described below.

[Generation of Examination Data]

The generation of examination data (HMAC value) in HMAC can be expressed by the following equation:

$$\text{hmac}(\text{data}) = h[(\text{key} \oplus \text{opad}) \| h\{(\text{key} \oplus \text{ipad}) \| \text{data}\}] \quad (1)$$

where
  h( ) represents a hash function,
  ∥ represents concatenation,
  ⊕ represents exclusive OR,
  ipad and opad are predetermined constants,
  key represents a private key, and
  data represents verification target data.

The first embodiment uses, as intermediate data, data in the middle of calculating the hash value of verification target data. On the other hand, the second embodiment uses, as intermediate data, data in the middle of calculating the hash value of hash function h{(key⊕opad)∥data}, of the two hash functions expressed by equation (1), which is located inside. Note that the verification data generation procedure is the same as that in the first embodiment except for the target of the hash function to which intermediate data is to be output.

[Functional Arrangement]

A functional arrangement for generating verification data in the second embodiment is the same as that shown in FIG. 1, and a functional arrangement for verifying the integrity of verification target data in the second embodiment is the same as that shown in FIG. 3. Processing different from that in the first embodiment will be described below.

Examination Data Generation Function

A hash value calculation unit 203 on the verification data generation side inputs a hash function upon combining a key "key" and a predetermined constant "ipad" to verification target data "data" as indicated by equation (1). A method of generating intermediate data is the same as that in the first embodiment. Note that in the first embodiment, only the examination data generation unit 204 uses a private key, whereas in the second embodiment, the hash value calculation unit 203 also uses a private key. As in the first embodiment, it is possible to read a private key from a nonvolatile memory device such as a USB memory held in the information processing apparatus or input a private key from an external device via a network or the like.

In addition, the examination data generation unit 204 generates an HMAC value by inputting a hash value from the hash value calculation unit 203. The examination data generation unit 204 in the first embodiment performs signature data generation processing in the narrow sense. In contrast, the examination data generation unit 204 in the second embodiment calculates the hash value HMAC of hash function h[(key⊕opad)∥hash value] located outside.

Verification Function for Verification Target Data

A hash value calculation unit 210 on the verification side calculates the intermediate data of the head segment by concatenating a predetermined constant "ipad" and a key "key" by the method represented by equation (1) and using a default initial value. For an intermediate segment, the hash value calculation unit 210 calculates intermediate data using intermediate data corresponding to a segment immediately preceding the intermediate segment as a hash initial value. For the end segment, data to be calculated is not intermediate data but is the hash value of the verification target data.

An examination data verification unit 212 generates an HMAC value using the hash value input from a distribution unit 211. The examination data verification unit 212 in the first embodiment performs signature verification processing in the narrow sense, whereas the examination data verification unit 212 in the second embodiment calculates the hash value HMAC of hash function h[(key+opad)∥hash value] located outside indicated by equation (1). HMAC is symmetric processing, and hence is the same processing as that performed by the examination data generation unit 204.

[Intermediate Data]

The method of generating intermediate data in the hash value calculation unit 203 on the verification data generation side differs from that in the first embodiment in that data to be input for the calculation of intermediate data is the data obtained by concatenating a predetermined constant "ipad" and a key "key" to verification target data. They also differ in that the examination data to be generated by the examination data generation unit 204 changes from signature data to HMAC. Others, including the number of intermediate data generated, are the same as those in the first embodiment.

The intermediate data verification method differs from that in the first embodiment in the following points. First, the intermediate data/hash value calculation method executed by the hash value calculation unit 210 on the verification side differs from that in the first embodiment. That is, upon determining in step S502 that the input segment is the head segment, the hash value calculation unit 210 concatenates the predetermined constant "ipad" and the key "key" and calculates intermediate data using a default initial hash value (step S503). In addition, for example, the data to be verified by the examination data verification unit 212 changes from signature data to an HMAC value. Others, including the number of intermediate data generated, are the same as those in the first embodiment.

A method of holding intermediate data will be described below. The first embodiment generates intermediate data only from verification target data, and hence can handle verification data including intermediate data in the same manner as verification target data. In contrast to this, the second embodiment uses a private key for the generation of intermediate data. It is therefore appropriate to regard intermediate data as information concerning the private key. In the second embodiment, therefore, it is necessary to manage intermediate data while maintaining its secrecy like a key.

It is possible to speed up verification processing by parallelization even when verifying the integrity of electronic data using verification data containing pairs of offsets and intermediate data based on HMAC in this manner. Containing an HMAC value as examination data in the verification data shown in FIG. 2, instead of signature data, can perform verification using general HMAC using HMAC values. It is therefore possible to maintain compatibility with a case in which entire verification target electronic data are collectively processed.

Note that the second embodiment can omit offsets from verification data as in the first embodiment. The method is the same as that described in the modification of the first embodiment, and hence a detailed description of it will be omitted.

Third Embodiment

Information processing in the third embodiment according to the present invention will be described below. The same reference numerals as in the first and second embodiments denote the same constituent elements in the third embodiment, and a detailed description of them will be omitted.

The third embodiment will exemplify a case in which a CMAC as a message authentication code is used for the base of verification of the integrity of electronic data. This embodiment uses MAC and is basically the same as the second embodiment. A slight difference in intermediate data will be described below. Note that a cryptographic algorithm adaptive to CMAC is a block cipher, and a typical algorithm is AES. However, the algorithm to be used is not limited to AES.

[Outline of CMAC]

An outline of CMAC will be described with reference to FIG. 7.

Figure 7:
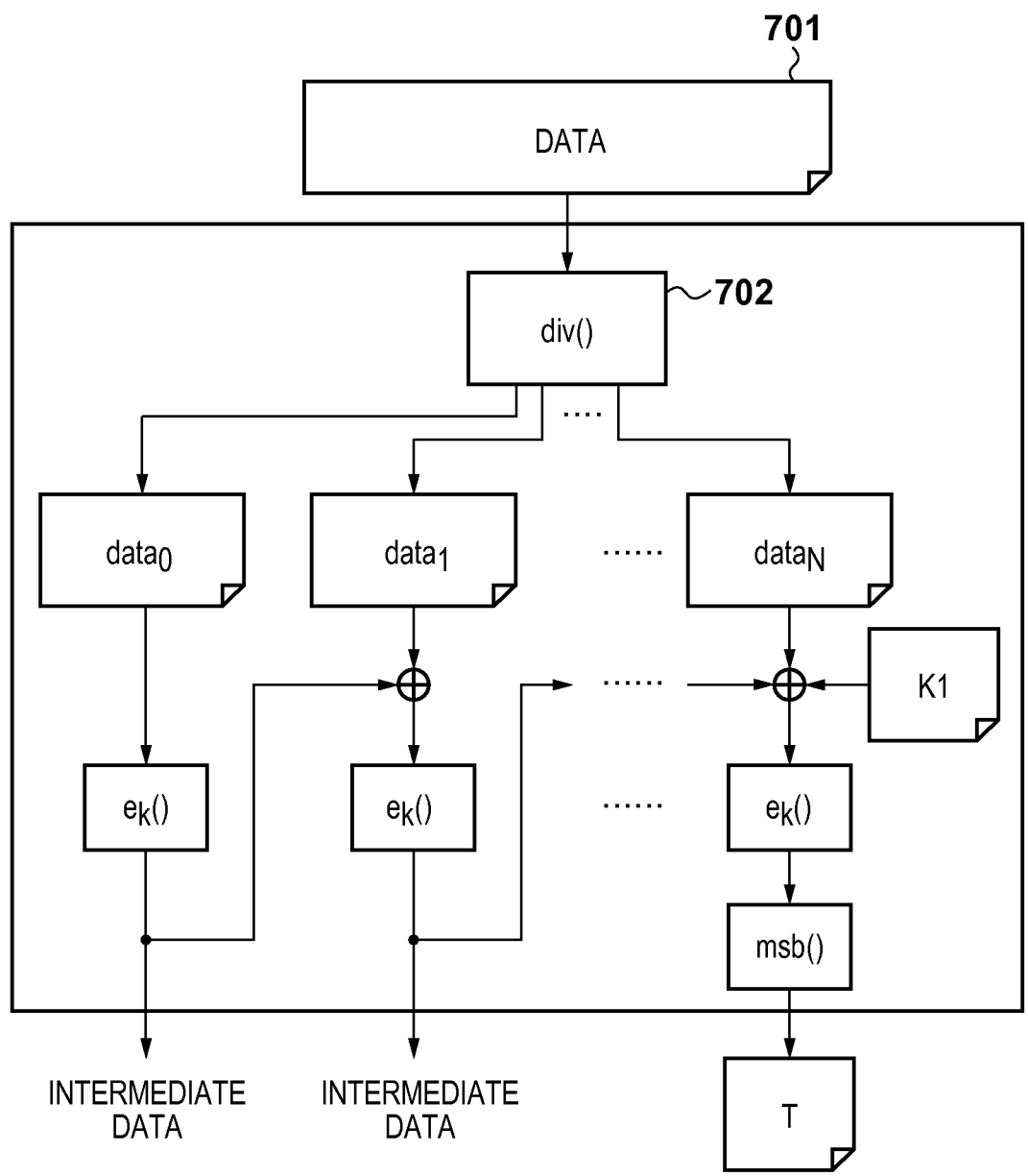
FIG. 7 is a view for explaining an outline of CMAC.

Referring to FIG. 7, data 701 is verification target data. Dividing processing (div( )) 702 divides the data 701 into segments of a predetermined size (the block size in a block cipher), performs processing for each block data, and inputs a processing result on a block immediately preceding each processing and block data. Note, however, that this processing differs from the processing shown in FIG. 4 in that there is no initial value in the processing of the data of the first block, and each processing performs encryption processing $e_k()$ using the key k and calculating the exclusive OR between the preprocessing result and block data. In addition, the processing for the data of the end block is exclusive OR among the preprocessing result, the data of the end block, and a key K1. This processing needs to extract an upper bit string from the exclusive OR result by processing msb( ) to output examination data T, and hence is more complicated than the processing in FIG. 4.

In the third embodiment, the result obtained by the encryption processing $e_k()$ other than the encryption processing $e_k()$ in the processing for end partial data is intermediate data. That is, general CMAC is configured to input the verification target data 701 and the key k to obtain the examination data T. In addition to this, the third embodiment outputs the result obtained in the middle of the encryption processing $e_k()$ as intermediate data. In addition, as in the first embodiment, pairs of intermediate data and offsets are output.

In order to generate intermediate data, it is necessary to input a key which is confidential information. As in the second embodiment, it is necessary to manage verification data containing intermediate data while maintaining its secrecy like a key.

[Functional Arrangement]

Verification Data Generation Function

Figure 8:
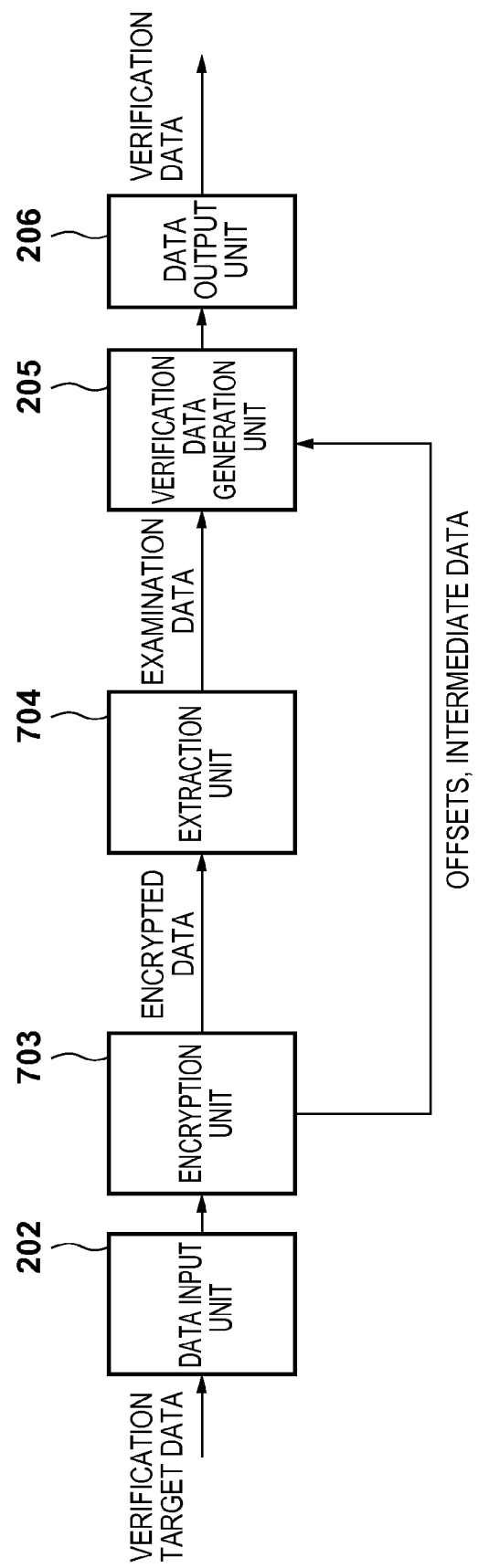
FIG. 8 is a block diagram for explaining a functional arrangement for generating verification data in an information processing apparatus according to the third embodiment.

A functional arrangement for generating verification data in the information processing apparatus of the third embodiment will be described with reference to the block diagram of FIG. 8. An arrangement different from the functional arrangement shown in FIG. 1 will be described.

In place of the hash value calculation unit 203 in the first embodiment, the third embodiment includes an encryption unit 703 which sequentially processes the verification target data input by the data input unit 202 in accordance with a block cipher algorithm.

In addition, in place of the examination data generation unit 204 in the first embodiment, the third embodiment includes an extraction unit 704 which extracts, as examination data, a predetermined upper bit string of the encrypted data input from the encryption unit 703.

Verification Function for Verification Target Data

A functional arrangement for verifying verification target data in the information processing apparatus of the third embodiment will be described with reference to the block diagram of FIG. 9. An arrangement different from the functional arrangement shown in FIG. 3 and processing will be described.

In place of the hash value calculation unit 210 in the first embodiment, the third embodiment includes an encryption unit 710 which performs encryption processing using partial data and intermediate data. More specifically, the encryption unit 710 generates the encrypted data of intermediate data and verification target data by repeating, up to the end partial data, encryption processing of using an encryption result (intermediate data) on the first partial data divided from verification target data based on the offsets contained in verification data as an input for the encryption of the second partial data following the first partial data.

A distribution unit 211 inputs the intermediate data generated by the encryption unit 710 to a comparison unit 213, and inputs the encrypted data of the verification target data generated by the encryption unit 710 to an examination data verification unit 212. The examination data verification unit 212 performs verification processing of the examination data input from a dividing unit 209 using the encrypted data input from the distribution unit 211.

Figure 9:
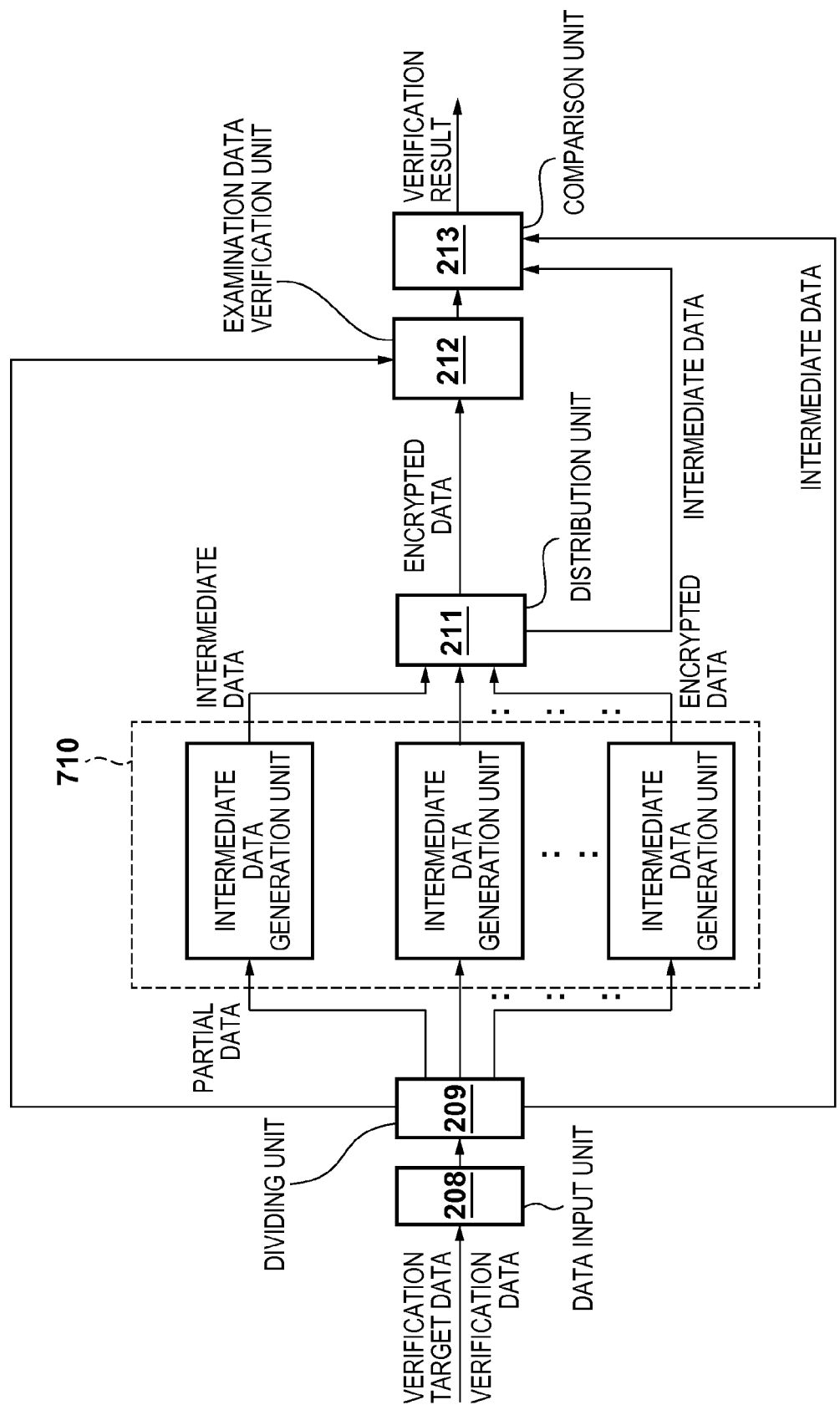
FIG. 9 is a block diagram for explaining a functional arrangement for verifying verification target data in the information processing apparatus according to the third embodiment.

The encryption unit 710 is formed as a parallel processing unit, as shown in FIG. 9. That is, intermediate data is generated by inputting partial data corresponding to an offset, which is output from the dividing unit 209, to any one of partial data generation units $710_1$ to $710_N$ constituting the parallel processing unit. It is possible to parallelly generate intermediate data in this manner.

Figure 10A:
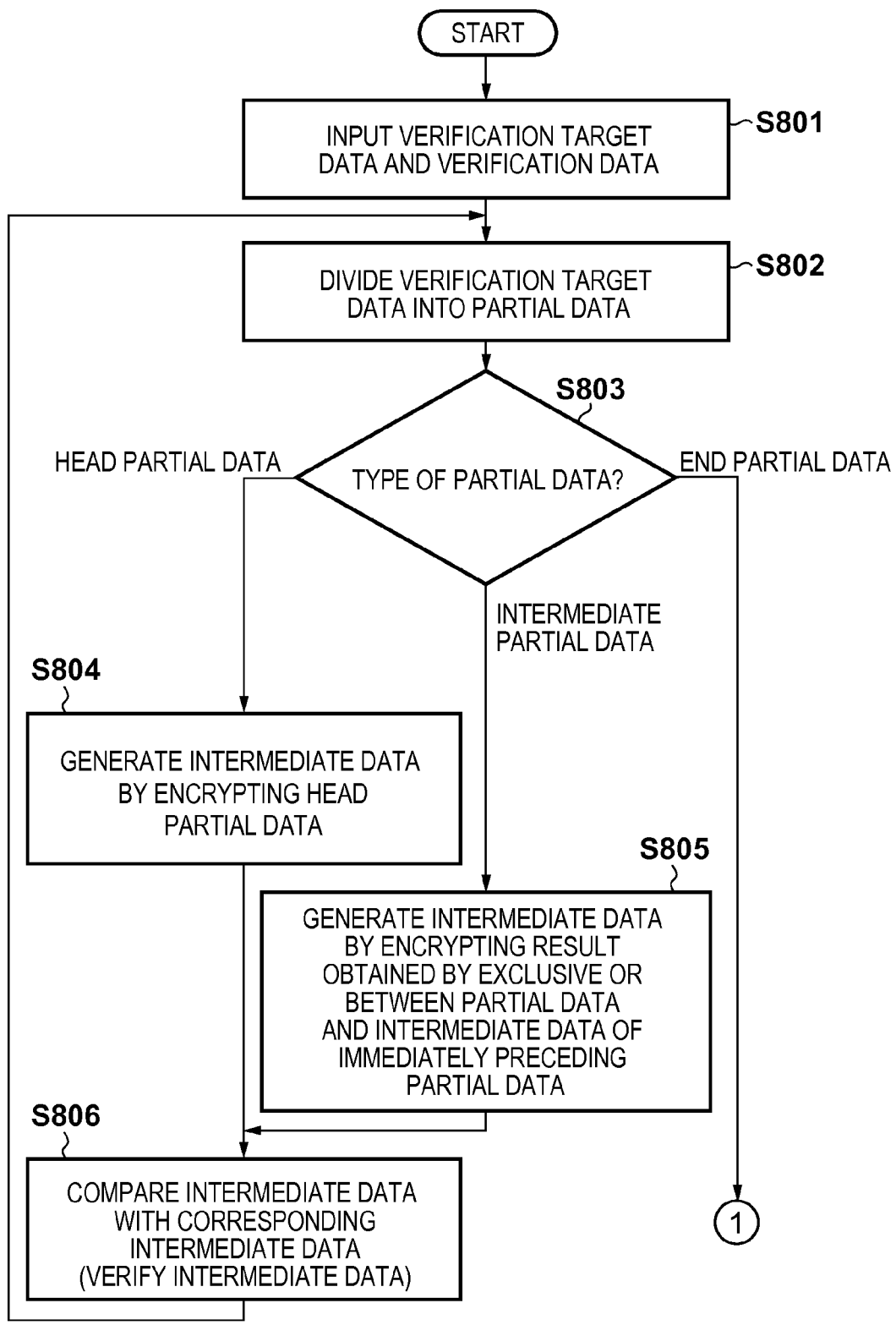
FIGS. 10A and 10B are flowcharts for explaining verification processing for verification target data.
Figure 10B:
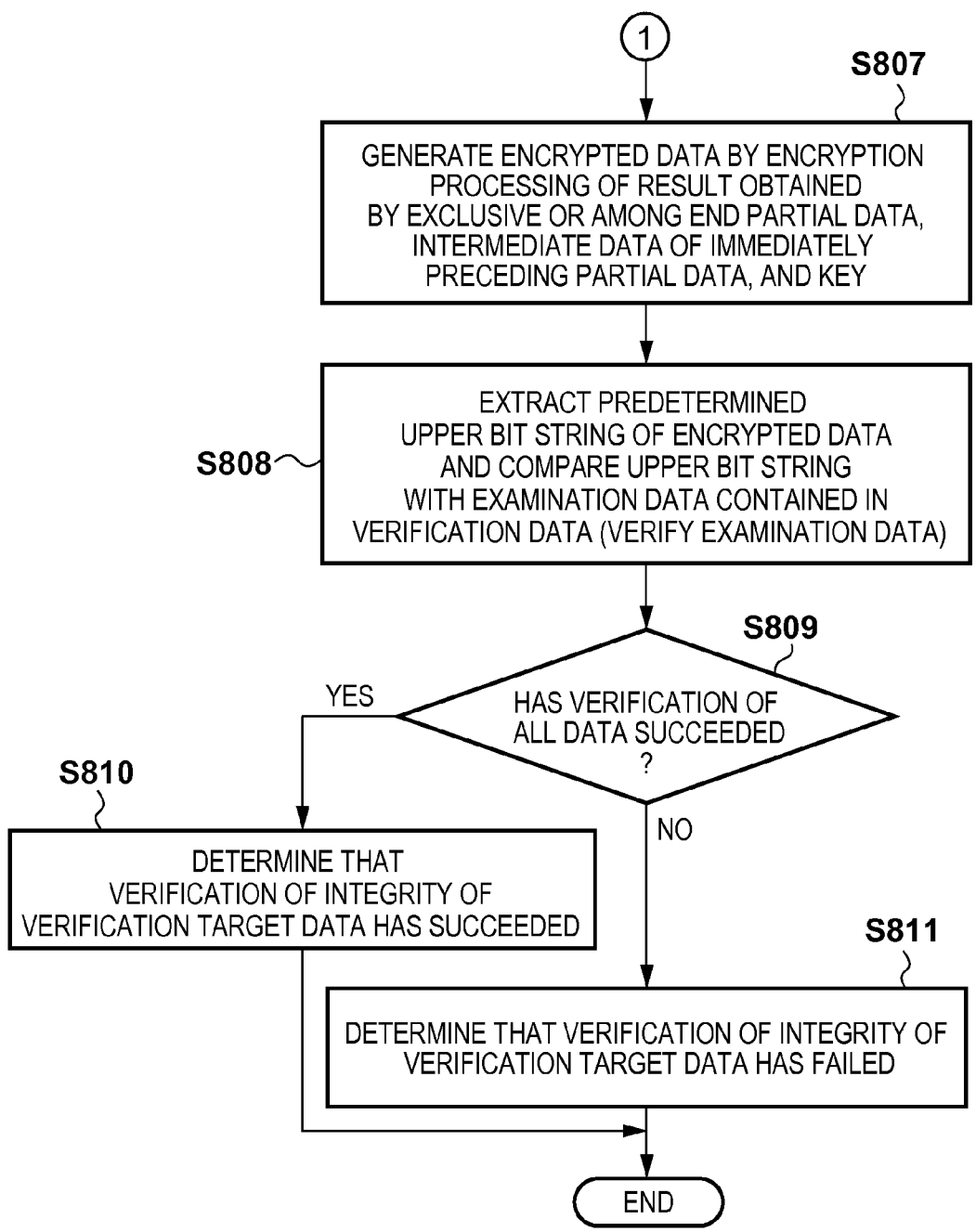

Verification processing of verification target data will be described with reference to the flowcharts of FIGS. 10A and 10B.

A data input unit 208 inputs verification target data and verification data (step S801). Note that the verification data includes examination data and a plurality of pairs of offsets and intermediate data, as shown in FIG. 2.

The dividing unit 209 divides the verification target data input by the data input unit 208 into partial data based on the offsets contained in the verification data input by the data input unit 208, and inputs each partial data to any one of the intermediate data generation units $710_1$ to $710_N$ (step S802). The intermediate data generation units $710_1$ to $710_N$ determine the types of partial data input from the dividing unit 209 (step S803). Note that the type of partial data is determined using offsets.

Upon determining that input partial data is head partial data containing only the first data of verification target data, the intermediate data generation units $710_1$ to $710_N$ generate intermediate data by performing encryption processing of the head partial data (step S804). Upon determining that input partial data is intermediate partial data containing data following the first data (in other words, not containing any first data), the intermediate data generation unit performs encryption processing of the result of exclusive OR between the partial data and the intermediate data of partial data immediately preceding the partial data, thereby generating the intermediate data of the partial data (step S805). Note that if partial data is larger than a predetermined block size in a block cipher, the intermediate data generation unit performs processing upon dividing the partial data into data of a predetermined block size.

The comparison unit 213 compares the intermediate data generated by any one of the intermediate data generation units $710_1$ to $710_N$ with the corresponding intermediate data input from the dividing unit 209 (step S806). Subsequently, the process returns to step S802.

Upon determining that input partial data is end partial data, the intermediate data generation unit generates encrypted data by performing encryption processing of the result obtained by exclusive OR among end partial data, the intermediate data of partial data immediately preceding the end partial data, and the key K1 (step S807). An examination data verification unit 212 extracts a predetermined upper bit string from the encrypted data finally generated by an encryption unit 710, and compares the extracted bit string with the examination data contained in verification data (step S808).

Upon determining in step S809 that all the comparison result (verification result) obtained by the examination data verification unit 212 and a comparison result (verification result) on intermediate data indicate a verification success, the comparison unit 213 determines that the verification of the integrity of the verification target data has succeeded (step S810). Otherwise, the comparison unit 213 determines that the verification of the integrity of the verification target data has failed (step S811).

If the comparison unit 213 detects a mismatch in verification processing (step S806) of each intermediate data or determines that verification in verification processing (step S808) of examination data has failed, it is possible to interrupt other processing at this time and advance to step S810 (verification has failed). In addition, encryption processing (steps S803 to S805 and S807) can be performed by parallel processing using the plurality of intermediate data generation units $710_1$ to $710_N$.

It is possible to speed up verification processing by parallelization even when verifying the integrity of electronic data using verification data containing pairs of offsets and intermediate data based on CMAC in this manner. Containing a CMAC value as examination data in the verification data shown in FIG. 2 instead of signature data can perform verification using general CAMC using CMAC values. It is therefore possible to maintain compatibility with a case in which entire verification target electronic data are collectively processed.

Note that the third embodiment can omit offsets from verification data as in the first embodiment. The method is the same as that described in the modification of the first embodiment, and hence a detailed description of it will be omitted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-262658, filed Nov. 30, 2011, and 2012-230264, filed Oct. 17, 2012 which are hereby incorporated by reference herein in their entirety.

What is claimed is:

1. An information processing apparatus comprising:
a processor and memory including instructions which, when executed by the processor, cause the information processing apparatus to act as:
an input section configured to input electronic data;
a divider configured to divide the electronic data into N (N is an integer satisfying N≥2) segments;
a computation section configured to generate examination data by repeating, up to an Nth segment, computation processing of using a computation result obtained by performing predetermined computation on data of an Mth (M is an integer satisfying 1≤M≤N−1) segment as an input for the predetermined computation of data of an (M+1)th segment; and
an output section configured to output the examination data and intermediate data of a computation result in the middle of generating the examination data so that the examination data and the intermediate data are used in verification of the electronic data.

2. The apparatus according to claim 1, further comprising a setting section configured to set a number of intermediate data output by the output section.

3. The apparatus according to claim 1, wherein the computation section further generates data indicating a data size of the electronic data processed before each computation processing, and
wherein the output section outputs data indicating a data size of the electronic data having undergone the computation processing before generation of the intermediate data in correspondence with the intermediate data.

4. The apparatus according to claim 1, wherein the intermediate data is encrypted.

5. An information processing apparatus comprising:
a processor and memory including instructions which, when executed by the processor, cause the information processing apparatus to act as:
an input section configured to input electronic data as a verification target, verification data for the electronic data, and intermediate data which is a computation result in the middle of generating the verification data;
a divider configured to divide the electronic data into N (N is an integer satisfying N≥2) segments so as to generate a plurality of partial data including one or a plurality of segments;
a plurality of computation sections, each of which is configured to repeat computation processing of inputting one of the plurality of partial data and inputting a computation result obtained by performing predetermined computation on a predetermined initial value or data of an (M−1)th segment to perform the predetermined computation for an Mth (M satisfies 1≤M≤N) segment included in the input partial data, up to an Xth (X is an integer satisfying M≤X≤N) segment included in the input partial data, wherein one of the plurality of computation sections, which has input partial data which does not include an Nth segment, generates intermediate data corresponding to the input partial data, and one of the plurality of computation sections, which has input partial data including the Nth segment, generates verification data for the electronic data; and
a verification section configured to verify integrity of the electronic data using the input verification data and intermediate data, and the generated verification data and intermediate data.

6. The apparatus according to claim 5, wherein the divider generates partial data corresponding in number to the intermediate data.

7. The apparatus according to claim 5, wherein the plurality of computation sections perform parallel processing of the plurality of partial data.

8. An information processing method comprising:
using a processor to perform the steps of:
inputting electronic data;
dividing the electronic data into N (N is an integer satisfying N≥2) segments;
computing examination data by repeating, up to an Nth segment, computation processing of using a computation result obtained by performing predetermined computation on data of an Mth (M is an integer satisfying 1≤M≤N−1) segment as an input for the predetermined computation of data of an (M+1)th segment; and
outputting the examination data and intermediate data of a computation result in the middle of generating the examination data so that the examination data and the intermediate data are used in verification of the electronic data.

9. The method according to claim 8, further comprising the step of setting a number of intermediate data output in the outputting step.

10. The method according to claim 8, wherein data, which indicates a data size of the electronic data processed before each computation processing, is generated in the computing step, and wherein data, which indicates a data size of the electronic data having undergone the computation processing before generation of the intermediate data, is outputted in correspondence with the intermediate data in the outputting step.

11. The method according to claim 8, wherein the intermediate data is encrypted.

12. An information processing method comprising:
using a processor to perform the steps of:
inputting electronic data as a verification target, verification data for the electronic data, and intermediate data which is a computation result in the middle of generating the verification data;
dividing the electronic data into N (N is an integer satisfying N≥2) segments so as to generate a plurality of partial data including one or a plurality of segments;
computing intermediate data and verification data using a plurality of computation sections, wherein each of the plurality of computation sections repeats computation processing of inputting one of the plurality of partial data and inputting a computation result obtained by performing predetermined computation on a predetermined initial value or data of an (M−1)th segment to perform the predetermined computation for an Mth (M satisfies 1≤M≤N) segment included in the input partial data, up to an Xth (X is an integer satisfying M≤X≤N) segment included in the input partial data, and wherein one of the plurality of computation sections, which has input partial data which does not include an Nth segment, generates the intermediate data corresponding to the input partial data, and one of the plurality of computation sections, which has input partial data including the Nth segment, generates the verification data for the electronic data; and
verifying integrity of the electronic data using the input verification data and intermediate data, and the generated verification data and intermediate data.

13. The method according to claim 12, wherein partial data corresponding in number to the intermediate data is generated in the dividing step.

14. The method according to claim 12, wherein the plurality of computation sections perform parallel processing of the plurality of partial data.

15. A non-transitory computer readable medium storing a computer-executable program for causing a computer perform an information processing method, the method comprising the steps of:
inputting electronic data;
dividing the electronic data into N (N is an integer satisfying N≥2) segments;
computing to generate examination data by repeating, up to an Nth segment, computation processing of using a computation result obtained by performing predetermined computation on data of an Mth (M is an integer satisfying 1≤M≤N−1) segment as an input for the predetermined computation of data of an (M+1)th segment; and
outputting the examination data and intermediate data of a computation result in the middle of generating the examination data so that the examination data and the intermediate data are used in verification of the electronic data.

16. A non-transitory computer readable medium storing a computer-executable program for causing a computer perform an information processing method, the method comprising the steps of:
inputting electronic data as a verification target, verification data for the electronic data, and intermediate data which is a computation result in the middle of generating the verification data;
dividing the electronic data into N (N is an integer satisfying N≥2) segments so as to generate a plurality of partial data including one or a plurality of segments;
computing intermediate data and verification data using a plurality of computation sections, wherein each of the plurality of computation sections repeats computation processing of inputting one of the plurality of partial data and inputting a computation result obtained by performing predetermined computation on a predetermined initial value or data of an (M−1)th segment to perform the predetermined computation for an Mth (M satisfies 1≤M≤N) segment included in the input partial data, up to an Xth (X is an integer satisfying M≤X≤N) segment included in the input partial data, and wherein one of the plurality of computation sections, which has input partial data which does not include an Nth segment, generates the intermediate data corresponding to the input partial data, and one of the plurality of computation sections, which has input partial data including the Nth segment, generates the verification data for the electronic data; and
verifying integrity of the electronic data using the input verification data and intermediate data, and the generated verification data and intermediate data.

* * * * *